March 21, 1950 R. SCHOLLER 2,501,192
SOLDERING IRON
Filed April 9, 1948
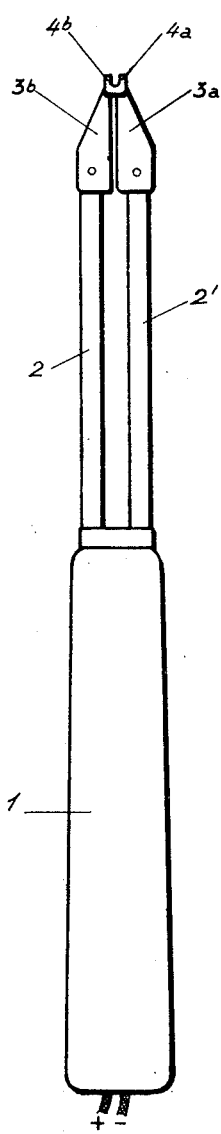
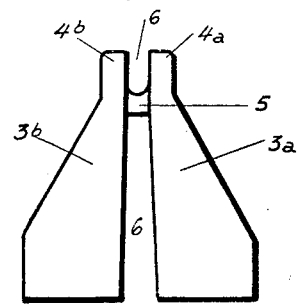
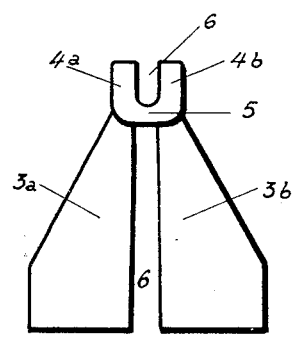
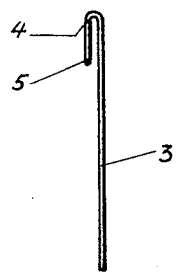
Inventor:
Rémy Scholler Patented Mar. 21, 1950

2,501,192

UNITED STATES PATENT OFFICE 2,501,192

SOLDERING IRON

Rémy Scholler, Rueil, France

Application April 9, 1948, Serial No. 19,969
In France February 2, 1948

2 Claims. (Cl. 219—26)

The drawbacks of soldering-irons with an electric resistance, as in use at the present time, are fully recognised; in addition to the comparatively long time required for obtaining the right temperature (several minutes), the users discover that the actual "iron" itself wears quickly and has to be sharpened all the time with the result that it goes out of action after a comparatively short run. Moreover, with the high voltages required for this sort of work with irons of this kind, there is ever present the danger of injury to the man handling the iron.

It is common knowledge, besides, that the solderer has to melt the fusible metal on the iron itself and make the drop of molten tin run in some way on to the place where it is to be used, and this has to be done very carefully, failing which, the actual soldering will not be properly executed.

It will be found, in fact, that through the very melting of the tin on their chamfered edges, the presently used irons retain, after the work is finished, a small amount of molten metal that drips off and is troublesome to recover, and then it is always in a shape that is of no use to the solderer.

The object of the present invention is a new type of electric soldering iron that alleviates all the drawbacks listed above.

The main principle of this iron lies in the fact that the heating element is a small peen of a suitable conducting metal (steel containing chromium and nickel preferably), this element being sufficiently thin and shaped so that it forms by itself a resistance just where it has to be used on the material to be soldered. It has no longer to be treated, therefore, over a flame but through the quick raising of temperature in a resistance.

Moreover, this element is so shaped that the wire of solder acting as a fuse may, when brought in contact with the area of the peen brought to a red heat, form itself, through its low conductivity, an element of electric resistance and melt at once.

In practice, the iron made up according to the invention is capable of making a good soldering job in less than ten seconds once it has been connected to the electric circuit, while standard electric irons, as they are provided today, require at least seven minutes. Lastly the structural makeup of the present form of soldering tool enables an exceedingly low voltage to be used (1 volt) thus ensuring complete safety for the workman.

The accompanying drawings show as a non-restrictive example a form of execution of the soldering-iron according to the invention.

In the drawings:

Fig. 1 illustrates in quite a diagrammatic way the assembly of the iron and its casing.

Fig. 2 shows one side of the soldering peen.

Fig. 3 shows the same but looking at the other side.

Fig. 4 is a side view of the same peen.

The soldering tool is made up, as a rule, of a handle 1 of wood, other non-conductive molded material or the like through which the connecting wires pass that lead to the two conducting arms 2 and 2'. These arms are kept apart from each other and their shape, their proportions and sizes may be modified depending on what the soldering tool has to do such as ordinary soldering, delicate work, a job requiring extreme accuracy, etc.

These arms may be made of copper, steel, etc. The closing of the circuit at the ends of the arms 2 and 2' is ensured by a peen or flattened element 3 of metal such as ferro-nickel, chromium-nickel, ferro-chromium, etc. shown in the shape of a thin plate fastened to the free end of each of the conducting blades 2 and 2'.

The plate element 3 itself is made of two separate portions 3a and 3b that are connected only at their end, that is bent over into two arms 4a and 4b of which the end parts are connected by a thin part 5. It is this narrow area 5 that forms the actual point of resistance and that, when the current is switched on in the apparatus, becomes red in a few seconds as well as the bent over portions 4a, 4b of the peen 3.

It will be easy to understand that the cross-sectional area of the resistance may be figured out so as to ensure a very quick rise of temperature at the working point.

If the workman now puts the end of the wire of easily melted material (tin, alloy of tin and lead, etc.) in the slot 6 arranged between the bent arms 4a and 4b, and demarcated besides by the link-up area 5, the easily melted material that is far more conductive than that formed by the peen 3, will act as a shunt resistance and melt at once.

The shape of the parts 4a, 4b, 5 and the proportions of the slot 6 may be designed to suit technical requirements and may enable, in case of necessity, the execution of the most delicate and accurate solderings.

The drop of molten metal will be put exactly where it is wanted.

The soldering, making a short-circuit with immediate melting, does not stick to the plate of alloy metal, thus cutting out any loss by waste.

A special transformer, of leakage type, regulates the strength of the current and will serve as a protection for the apparatus in the event of a short circuit. The very low voltage (1 volt), on the other hand, eliminates any danger of injury to any attendant, as already stated above.

The apparatus that has been disclosed, may without widening unduly the scope of the invention, as claimed in accompanying claims, undergo changes in detail dealing, for instance, with the sizes, shapes and proportions of the arms, peen or wires taking its place, etc., according to what this outfit has to do.

Just as it is, the new soldering iron as disclosed is offered as a completely novel product ensuring the following good points in comparison to previous technique:

1. It can be got ready for use very quickly.
2. Immediate soldering.
3. Accurate soldering, even for the most delicate work.
4. Elimination of soldering waste.
5. No risk at all for any attendant.
6. Practically indefinite life without any sharpening being required.
7. Low power consumption due to its low voltage and amperage.

What I claim is:

1. A soldering iron comprising in combination two J-shaped electrical conductors arranged parallel to and at a slight distance from each other; electrically insulated holding means secured to said electrical conductors at the ends of the long legs thereof; and a bridge-shaped connecting member consisting of an electrically conductive material having a relatively high electrical resistance and secured to said electrical conductors at the other ends thereof.

2. A soldering iron comprising in combination two J-shaped electrical conductors arranged parallel to and at a slight distance from each other; electrically insulated holding means secured to said electrical conductors at the ends of the long legs thereof; and a bridge-shaped connecting member secured to said electrical conductors at the other ends thereof so as to form a slot between said electrical conductors into which solder can be inserted forming a short-circuit between said conductors enabling instantaneous melting of said solder, whenever required.

RÉMY SCHOLLER.

REFERENCES CITED

The following references are of record in the file of this patent:

UNITED STATES PATENTS

| Number | Name | Date |
|---|---|---|
| 2,405,866 | Weller | Aug. 13, 1946 |

FOREIGN PATENTS

| Number | Country | Date |
|---|---|---|
| 389,309 | Germany | Feb. 7, 1924 |